United States Patent [19]
Strobel et al.

[11] Patent Number: 4,719,070
[45] Date of Patent: Jan. 12, 1988

[54] PROCESS AND MOLDING PRESS FOR PRODUCING FLAT MOLDINGS

[75] Inventors: Klaus Strobel; Karl Schwarzmeier, both of Selb; Eugen Bühler, Schleifweg 3, D-8871 Burtenbach, all of Fed. Rep. of Germany

[73] Assignees: Hutschenreuther AG, Selb; Eugen Bühler, Burtenbach, both of Fed. Rep. of Germany

[21] Appl. No.: 753,730

[22] Filed: Jul. 10, 1985

[30] Foreign Application Priority Data

Jul. 10, 1984 [DE] Fed. Rep. of Germany ....... 3425392

[51] Int. Cl.[4] ........................ B29C 43/04; B29C 43/34

[52] U.S. Cl. .................................... 264/319; 100/196; 264/334; 425/408; 425/422; 425/441

[58] Field of Search ............... 425/128, 193, 195, 236, 425/337, 344, 351, 408, 405 R, 405 H, 422, 441; 100/194–197, 208, 199; 264/319, 325, 334

[56] References Cited

U.S. PATENT DOCUMENTS

| | | | |
|---|---|---|---|
| 447,132 | 2/1891 | Hull et al. | 425/344 |
| 1,317,354 | 9/1919 | Crawford | 100/194 X |
| 1,330,711 | 2/1920 | Kinney et al. | 100/196 X |
| 1,576,989 | 3/1926 | Pasquali et al. | 425/344 |
| 1,737,143 | 11/1929 | Burnham | 425/344 |
| 2,714,849 | 8/1955 | Carver | 100/197 X |
| 3,533,137 | 10/1970 | Michelson | 425/408 |
| 3,555,730 | 1/1971 | Brink | 425/128 X |
| 4,025,268 | 5/1977 | Taylor | 425/422 X |
| 4,334,663 | 6/1982 | Ponginibbio | 425/408 X |

FOREIGN PATENT DOCUMENTS

| | | |
|---|---|---|
| 461476 | 6/1928 | Fed. Rep. of Germany . |
| 572509 | 3/1933 | Fed. Rep. of Germany . |
| 2254252 | 5/1973 | Fed. Rep. of Germany . |
| 2437852 | 2/1975 | Fed. Rep. of Germany . |
| 2247093 | 10/1975 | Fed. Rep. of Germany . |
| 2557728 | 5/1978 | Fed. Rep. of Germany . |
| 3101236 | 1/1982 | Fed. Rep. of Germany . |
| 3128347 | 2/1983 | Fed. Rep. of Germany . |
| 3144678 | 5/1983 | Fed. Rep. of Germany . |
| 3207565 | 9/1983 | Fed. Rep. of Germany . |

*Primary Examiner*—Richard L. Chiesa
*Attorney, Agent, or Firm*—Toren, McGeady & Associates

[57] ABSTRACT

A process of and a molding press for producing flat moldings comprising a plurality of press molds arranged in series with each other, with each press mold having relatively movable mold parts. In the process effecting relative movement of the mold parts of each of the press molds to an open position and introducing particulate molding material into the mold cavities so formed, and then simultaneously effecting relative movement of the mold parts of each press mold to a closed position in which the molding material in each mold cavity is pressed to form a flat molding. Subsequently, effecting relative movement of the mold parts of each press mold to a position in which the flat moldings are removed from the mold cavities.

19 Claims, 17 Drawing Figures

PROCESS AND MOLDING PRESS FOR PRODUCING FLAT MOLDINGS

BACKGROUND OF THE INVENTION

This invention relates to a process and a molding press for producing flat moldings, e.g. slab moldings.

A process is known in which a particulate molding material, especially spray-dried porcelain granules, is introduced into the molding cavity of a press mold formed by at least two mold parts, the molding material is then pressed by means of a press when the two mold parts are brought nearer to one another, and the flat molding is removed after the mold cavity has been opened.

Conventionally, this process is carried out by arranging several bottom molds next to one another on the press floor of a vertical press and moving the press plunger together with the corresponding top molds against the bottom molds from above, after the bottom molds have been filled with the molding material. The bottom molds are filled by means of a filling slide.

If it is assumed that the size of a slab is approximately 22×22 cm, that the necessary press pressure is approximately 400 $kp/cm^2$, and that 10 slabs are simultaneously produced next to one another on the press, then a pressing force of 2000 Mp is required.

It can be seen immediately from this example that, because of the sharply increasing pressing force, narrow limits are set as regards the number of slabs to be produced simultaneously.

SUMMARY OF THE INVENTION

The object of the present invention is to enable a given press output per press cycle to be achieved with less pressing force.

According to the present invention, there is therefore provided a process for producing flat moldings comprising arranging a plurality of press molds in series with each other, each press mold having relatively movable mold parts, effecting relative movement of the mold parts of each of the press molds to an open position and introducing particulate molding material into the mold cavities so formed; simultaneously effecting relative movement of the mold parts of each press mold to a closed position in which the molding material in each mold cavity is pressed to form a flat molding; and effecting relative movement of the mold parts of each press mold to a position in which the flat moldings are removed from the mold cavities.

Preferably, the press molds are maintained next to one another in a horizontal direction. This has the advantage that the flat moldings can be removed from all the press molds at one and the same level, and this is beneficial for the further handling of the flat moldings.

Furthermore, it has proved advantageous if the flat moldings can be removed from the respective press molds by falling from them. In this way, it is possible to avoid the use of extraction devices for pushing the flat moldings out of the individual press molds, these extracting devices being difficult to accommodate precisely when there are a plurality of press molds located above one another, and when the distance between the press molds in the pressing direction is to be kept short.

The pressing material can be introduced into the mold cavity when a vacuum is applied to the latter. This filling method proves highly advantageous in comparison with the previously known filling by means of a filling slide. In particular, in the said previously known method of filling, it was impossible, during the return stroke of the filling slide, to prevent a compression of the molding material over which the filling slide travels, that is to say, in particular, of the spray-dried porcelain granules, and indeed this compression was greatest in those regions of the bottom mold over which the returning filling slide traveled last. The result of this was that the moldings had differing densities, thus leading to dimensional differences in the case of the baked moldings. The difference in thickness occurring were the more noticeable, the thinner the flat molding became. It was impossible to produce by the known process slabs with a thickness of 2 mm and an area of more than 150×150 mm.

In the process according to the invention, it is possible, when the molding material is introduced into each mold cavity when a vacuum is applied to the latter, to fill each press mold with a high degree of uniformity as regards density. It therefore also becomes possible to produce slabs with a large surface area and a small wall thickness and to exceed the hitherto critical size of 150×150 mm with a wall thickness of 2 mm.

A further advantage of this method of filling is that the sealing-off problems unavoidable where slide filling is concerned no longer arise. It has hitherto been impossible to prevent granulate from escaping at the junctions between the filling slide and the hopper and leading in an uncontrollable way to the spread of dust in the workrooms.

This method of filling is known per se from German Offenlegungsschrift No. 3,101,236.1. However, when combined with the process of the present invention, this method of filling produces a particularly advantageous result.

As known per se from German Offenlegungsschrift No. 3,128,347 the filling operation can be further assisted by means of the supply of fluidizing air, to achieve even greater uniformity in the filling operation and the density obtained.

The invention comprises a molding press for producing flat moldings comprising a plurality of press molds arranged in series with each other, each press mold having relatively movable mold parts; a press plunger for acting on the press molds so as to effect relative movement of the said mold parts; an end crosspiece which is connected, by means of a guide linkage extending in the pressing direction and transmitting a pulling force, to a press crosspiece which guides the press plunger; the press molds being arranged in succession on the guide linkage and face-to-face mold parts of successive press molds being connected to one another so as to transmit a pressure force therebetween; the mold parts of the press molds at opposite ends of the press which face away from one another resting indirectly or directly against the press plunger and against the end crosspiece respectively.

Because the press molds are arranged in series with each other, the press can have a smaller construction than the known presses in which the press molds are arranged in parallel.

The advantages of the molding press according to the invention, in comparison with the known presses, emerge the more clearly, the flatter the moldings to be produced, because the total stroke of the press obtained by multiplication from the opening stroke of an individual press mold and the number of press molds, becomes the smaller, the smaller the opening stroke of an individual mold, and this opening stroke can be kept smaller, the more the shape of the flat molding approximates to a plane-parallel slab. Consequently, the process according to the present invention and the molding press according to the present invention are particularly suitable for producing slabs, such as floor slabs and tiles.

In comparison with known presses with a parallel arrangement of the individual press molds, the output of press force of the press used is reduced roughly by a factor corresponding to the number of press molds arranged in parallel. In addition to slabs composed of porcelain granules and other ceramic materials, it is also possible to make small slabs, for example with a size of 50×50 mm and a thickness of 0.5 mm, from special materials, such as, for example, $Al_2O_3$, and hitherto it has only been possible to produce these by casting.

The face-to-face mold parts of any two successive molds can be attached rigidly to a common mold cross-piece, thus reducing the number of individual parts the movements of which are to be monitored during the work cycle.

Whereas there is no problem in controlling the movement of the individual mold parts during the pressing operation, because the press molds arranged in series need only be pressed together by means of at least two mold parts belonging to each of them, until either the molding material in them is sufficiently compressed or molding-stroke limiting stops have come together, special measures are desirable, during the pressing opening stroke, to bring the mold parts of the individual press molds again exactly into those positions in which the flat moldings can be removed and refilling can be carried out.

Thus the mold parts belonging to a press mold may be prestressed by spring means to a maximum distance between them defined by stops, this maximum distance corresponding to a filling and a removal position of the mold parts. Moreover, there may be connected to a press plunger a mold opening linkage which has, for groups of adjacent mold parts of successive press molds, an engagement means engageageable with an engagement stop.

To ensure that it becomes possible to remove the flat moldings even after the least possible stroke of the mold parts relative to one another, at least one closing slide with an orifice may be provided for each mold, this closing slide being adjustable by means of an adjusting device which is attached respectively to one of the mold parts. It thus becomes possible to design the basic mold parts, at least over some of their periphery, as rimless slabs. This means that the molding stroke of the mold slabs relative to one another can be reduced to the amount necessary to bring the introduced molding material, which if desired may be already pre-compressed during filling under a vacuum, to the final compression at which the flat molding can be further processed.

When a closing frame enclosing the mold parts of a mold over their entire periphery is used, the mold parts can be designed as rimless slabs over their entire periphery, thus resulting in a reduction in mold costs. Moreover, the advantage achieved is that only one adjusting device is required to shift the closing frame, in contrast to the possible alternative where several closing slides are arranged distributed over the periphery of the press mold.

The closing frame may have a filling orifice in its upper position so that the filling of the press mold is assisted by the gravity fall of the molding material.

There may be arranged on the upper portion of the closing frame an intermediate hopper which is connected to a main hopper via a flexible line connection. This ensures that, on the one hand, the stock of molding material for at least one filling of the press mold is immediately available at the press mold, but that, on the other hand, there is no need for hoppers of excessive size for the individual molds.

The closing frame may have a vacuum connection orifice in its lower portion. This ensures that, when the molding material is introduced from above as a result of the simultaneous effect of suction and gravity, the best possible distribution and uniformity in the density of the flat moldings are achieved.

The adjusting device may cause a displacement of the closing slide during the pressing operation to ensure that the relative movement, and consequently the friction, between the molding material and the closing slide is minimized. This ensures that the active pressing effect of the press is reduced as little as possible by the friction of the molding material on the closing slide, and the friction of the marginal zone of the molding material on the one hand and of the closing slide on the other hand does not result in any damage to the structure of the molding, for example in the form of differences in density. It can be stated as a rule that, when a movable mold part approaches a stationary mold part by the amount of a press molding stroke X, the closing slide is moved towards the stationary mold part by the distance X/2.

The closing slide may be stressed at least over part of the stroke of the adjusting device by a fluid-controlled stop which serves to control the movement of the closing slide by means of the adjusting device. This provides a simple design of the control hydraulics for the adjusting device.

Alternatively, a press mold may have an upper closing slide with a filling orifice therein, there being a lower closing slide with an orifice therein. Thus this is an alternative to the use of a closing frame surrounding the entire periphery of the mold parts.

A press mold may be closed. This is particularly useful when the press mold is closed off at the top and bottom by respective closing slides, and when it is important to close off the lateral limitations of the mold cavity without the need for additional means of movement control. An additional advantage, which in certain circumstances is useful for slab production, is that, when the rim strip is squeezed together, an additional compression of the molding material occurs in the marginal zone perpendicularly to the general pressing direction.

It is particularly simple to remove the flat moldings from the press mold if the moldings freed when the press molds are opened and being detached as a result of their springing-back movement simply fall downwards and at the same time are deflected into the horizontal via curved sliding tracks. As a result of the engagement of the flat moldings with the surface of the sliding track, it is possible at the same time to slow the running speed of the flat moldings along the sliding track. A conveyor for all the sliding tracks, or a conveyor for one or more particular sliding tracks, can be connected to the sliding track, in order to deliver the flat moldings to the respective further-processing stations.

If the same products are produced in all the press molds, a single further conveyor is usually sufficient. If different flat moldings are produced in different press molds of one and the same press, this being perfectly possible according to the invention, individual further conveyors will preferably be assigned to the individual press molds.

BRIEF DESCRIPTION OF THE DRAWING

The invention is illustrated, merely by way of example, in the accompanying drawings, in which.

DETAILED DESCRIPTION OF THE INVENTION

Terms such as "right" and "left" are used in the description below, are to be understood to refer to directions as seen in the accompanying drawings.

Figure 1:
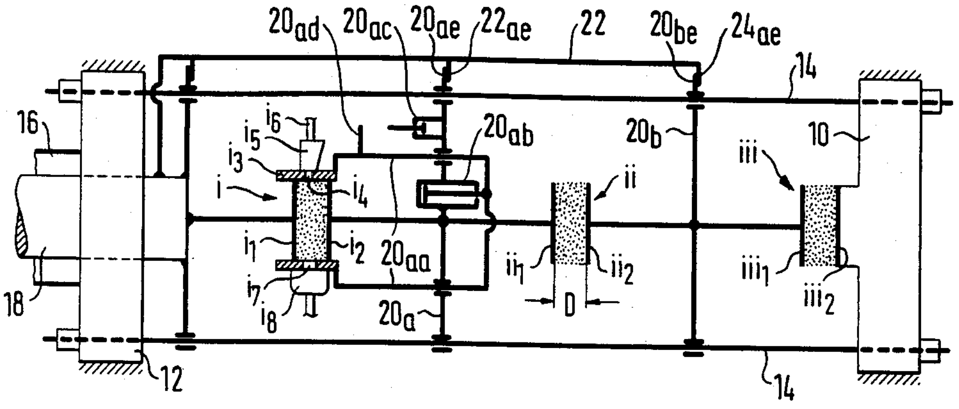
FIG. 1 shows, in a side view, a diagram of a molding press according to the invention, with a press mold in the filling position.
Figure 2:
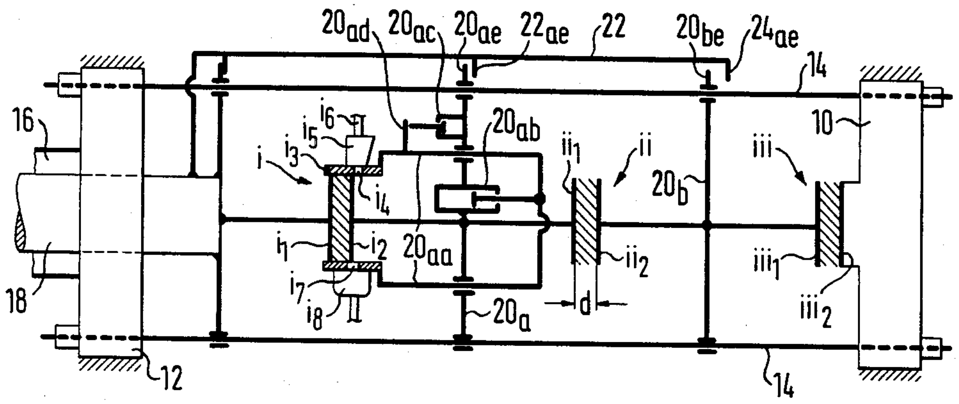
FIG. 2 shows the molding press according to FIG. 1 in the position assumed after pressing has been carried out.
Figure 3:
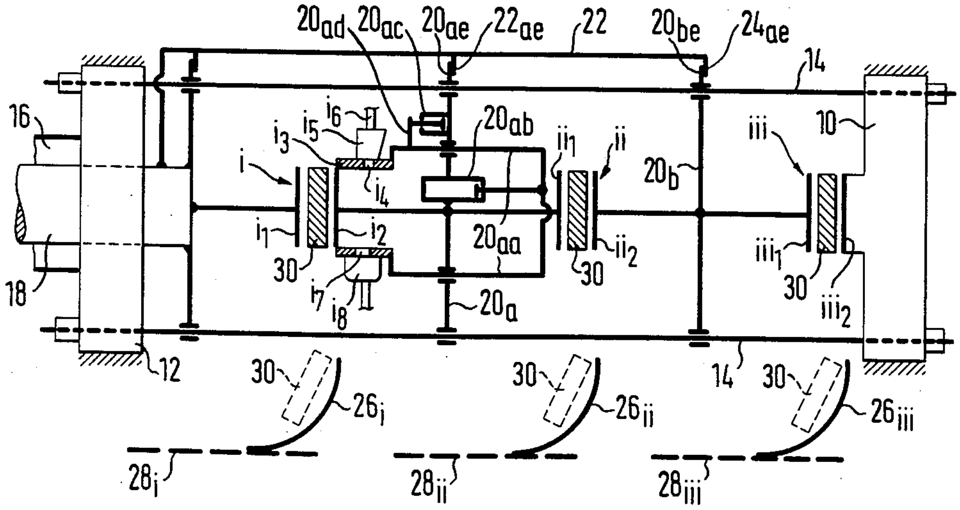
FIG. 3 shows the moulding press according to FIG. 1 in the position corresponding to the removal of the flat moldings from the press molds.
Figure 10:
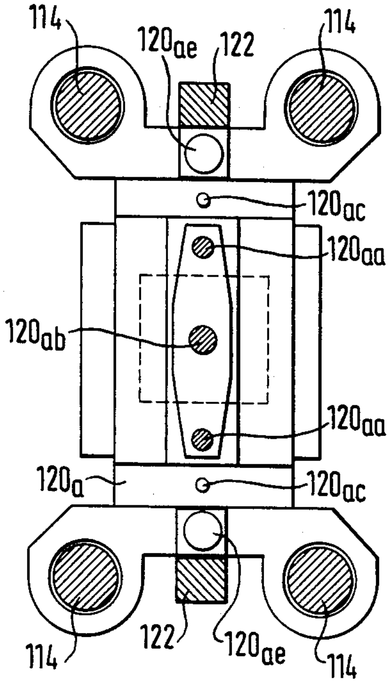
FIG. 10 shows a section along the line X—X of FIG. 9.

FIGS. 1 to 3 illustrate diagrammatically a horizontal press which is formed by an end crosspiece 10, a press crosspiece 12, connecting bars 14, a press cylinder 16 and a press plunger 18. In actual fact, instead of the two connecting bars 14 shown, four or more connecting bars can be provided altogether, and in the case of four connecting bars, as shown in FIG. 10, one pair of connecting bars is located behind and the other pair in front of the plane of the drawing.

The press is provided with three press molds i, ii and iii. The press molds i, ii and iii consist of the mold parts $i_1$, $i_2$, the mold parts $ii_1$, $ii_2$ and the mold parts $iii_1$, $iii_2$ respectively.

The mold part $i_1$ is connected directly to the press plunger 18. The mold parts $i_2$ and $ii_1$ are connected to a mold crosspiece $20_a$. The mold parts $ii_2$ and $iii_1$ are connected to a mold crosspiece $20_b$. The mold part $iii_2$ is connected to the end crosspiece 10. As indicated at the mold i, the molds also incorporate a closing frame $i_3$. This closing frame $i_3$ has a filling orifice $i_4$, to which an intermediate hopper $i_5$ assigned. The intermediate hopper $i_5$ is connected via a flexible line $i_6$ to a main hopper (not shown). The closing frame $i_3$ also has, in its lower frame, a vacuum connecting orifice $i_7$ with communicates via a line $i_8$ to a vacuum source. The closing frame $i_3$ is connected via an adjusting linkage $20_{aa}$ to a hydraulic adjusting device $20_{ab}$. To control the movement of the closing frame $i_3$ relative to the mold crosspiece $20_a$, a fluid-controlled stop $20_{ac}$ is also attached to the mold crosspiece $20_a$ and is engageable with an adjustable stop $20_{ad}$ of the adjusting linkage $20_{aa}$.

Connected to the press plunger 18 is a mold-opening linkage 22 which has engagement means $22_{ae}$ and $24_{ae}$ for engagement with respective engaging stops $20_{ae}$ and 20*be* of the mold crosspieces $20_a$ and 20*b*.

It can be seen from FIG. 3 that a sliding track $26_i$, $26_{ii}$ an $26_{iii}$ is assigned respectively to each of the press molds i, ii and iii. The sliding tracks are connected to conveyor belts $28_i$, $28_{ii}$ and $28_{iii}$.

In FIG. 1, the apparatus is shown in the filling position. The mold parts of each of the press molds are at their maximum distance D from one another. The mold cavity of the press mold i is connected to the intermediate hopper $i_5$ via the filling orifice $i_4$. A vacuum is built up in the mold cavity of the press mold i through the vacuum connection orifice $i_7$, and by means of this vacuum the molding material is sucked into the mold cavity. At the same time, fluidizing air is introduced in the intermediate hopper or at the entrance of the mold cavity. The molding material is poured into the mold cavity and compressed with a uniform density.

Subsequently, the press plunger 18 is moved to the right, until it reaches the positiion according to FIG. 2. The mold parts of the individual press molds are thereby brought nearer to one another so as to be separated by a distance d. During the pressing operation, the closing frame $i_3$ is moved to the right by means of the hydraulic adjusting device $20_{ab}$, the stroke of the hydraulic adjusting device amounting, for example, to $(D-d/2)$. The vacuum in the press mold i can be maintained during the pressing operation or at least during part of the pressing operation.

During pressing, the engagement means $22_{ae}$ and $24_{ae}$ are spaced from the engagement stops $20_{ae}$ and 20*be* to different extents. As is evident from FIG. 2, the spacing is the greater, the nearer the particular crosspiece is to the end crosspiece 10.

In FIG. 3, after the return of the press plunger 18 to the left, the parts reach the emptying position, the latter being identical to the filling position. That is to say, the mold parts of the individual press molds are again brought to relative positions having the distance D between them. The closing frame $i_3$ is shifted further to the right by means of the hydraulic adjusting device $20_{ab}$, so that the mold cavity is completely open at the bottom (and also at the top) and the flat moldings 30, which have been formed from the molding material as a result of the pressings, can fall out downwards between the mold parts which have been so separated from one another, the flat moldings being detached from the mold parts as a result of their inherent capacity to spring back from the latter. The flat moldings 30 pass via the sliding tracks $26_i$, $26_{ii}$, $26_{iii}$ onto the conveyor belts $28_i$, $28_{ii}$, $28_{iii}$.

FIGS. 4 to 11 show in detail an actual embodiment of the pesent invention whose basic design corresponds to that of the apparatus according to FIGS. 1 to 3. Similar parts are provided with the same reference symbols as in FIGS. 1 to 3, but in many cases have been increased by 100.

The following additional features to the diagrammatic representation according to FIGS. 1 to 3 should be noted.

Figure 4:
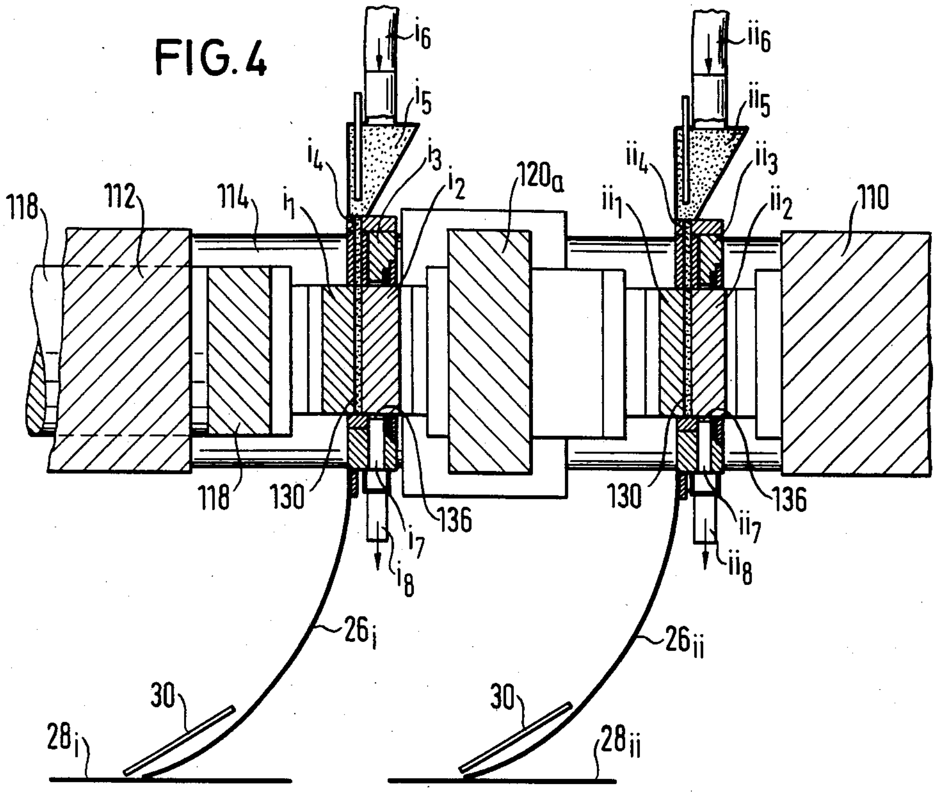
FIG. 4 shows a side view, partially in section, of two successive press molds in the filling position.
Figure 5:
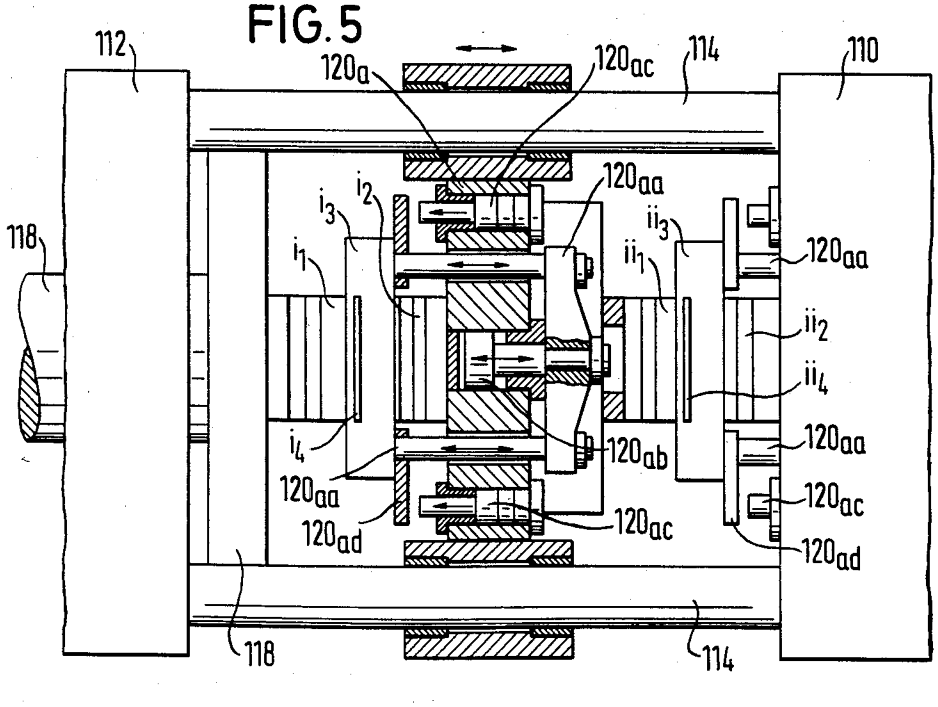
FIG. 5 shows a plan view, partially in section, of FIG. 4.
Figure 6:
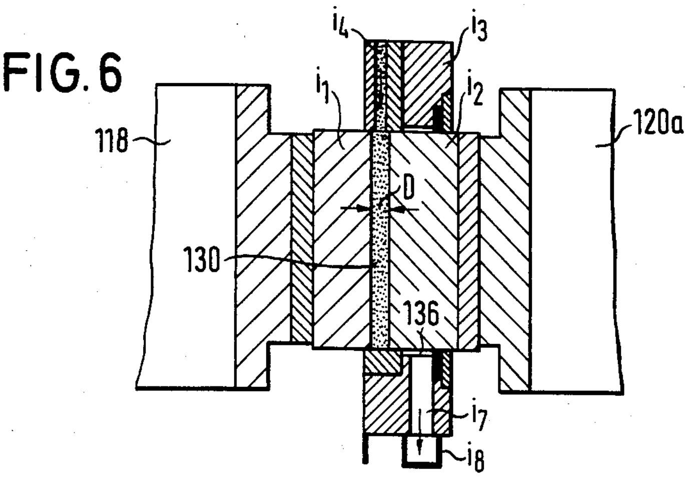
FIGS. 6, 7 and 8 show side views, partially in section, of the embodiment according to FIGS. 4 and 5, in the filling, pressing and emptying positions respectively.
Figure 7:
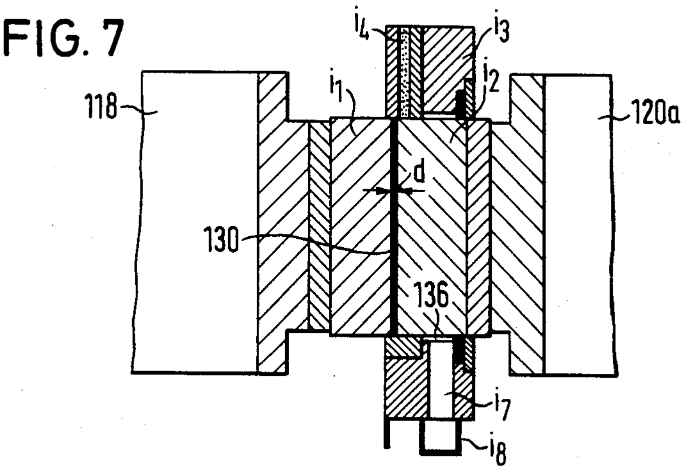
Figure 8:
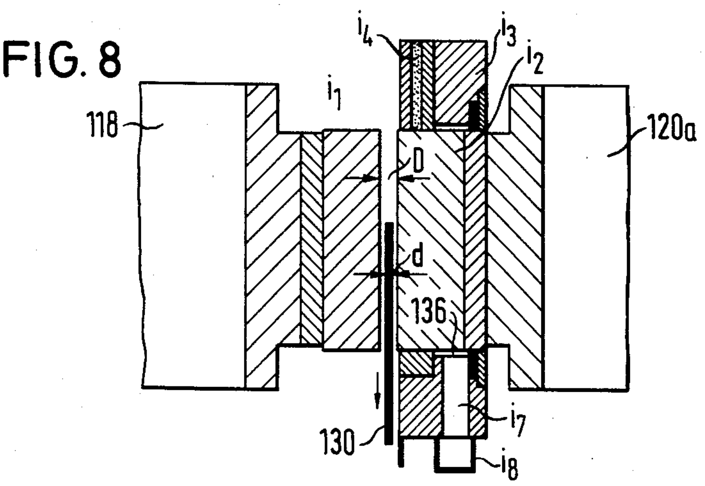

In the filling position shown in FIG. 4, the vacuum connection orifices $i_7$ etc., are not in vertical alignment with the mold cavity, but are offset laterally, vacuum suction taking place through a gap 136.

Figure 9:
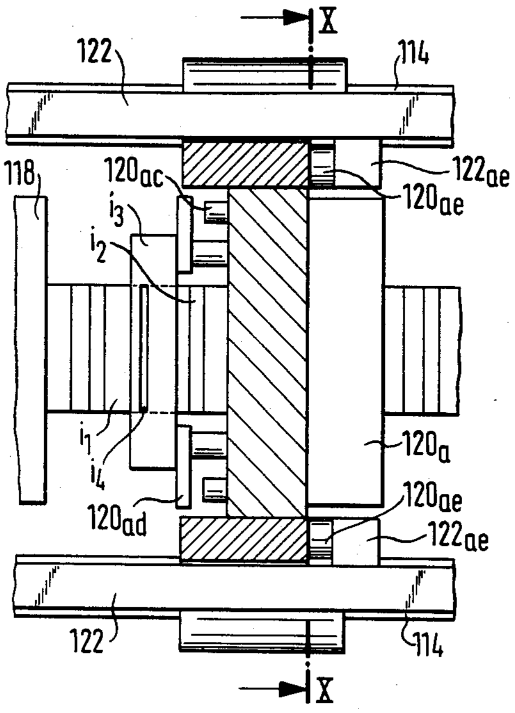
FIG. 9 shows a further plan view of the arrangement according to FIG. 4 in another sectional plane.

As shown in FIGS. 9 and 10, the engagement means $\mathbf{122}_{ae}$ and the engagement stops $\mathbf{120}_{ae}$ are designed as permanent magnets which are separated from one another during pressing. During the return stroke into the emptying or filling position, the permanent magnets come together again, the mold crosspieces being brought to the same distances from one another, so that the mold parts of each of the molds are each at the same distance apart from one another.

Figure 11:
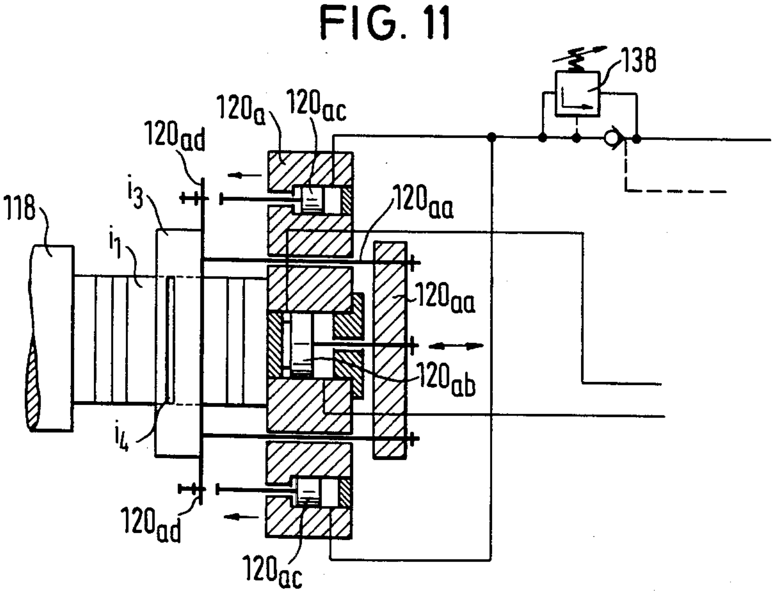
FIG. 11 shows a diagrammatic representation of a hydraulic circuit for moving a closing frame.

FIG. 11 shows that a pressure-limiting valve 138, which serves to control the movement of the closing frame $i_3$, is provided for the fluid-controlled stop 120*ac*By means of this pessure-limiting valve 138, the movement of the closing frame $i_3$ can be controlled during pressing and also during the transition from the pressing position to the emptying position. Of course, it is also possible to leave the control of the movement of the closing frame $i_3$ solely to the hydraulic adjusting device $\mathbf{120}_{ab}$.

In principle, it is also possible to control the closing frame $i_3$ as a function of the relative movement of the mold parts $i_1$ and $i_2$ in relation to one another.

Figure 12:
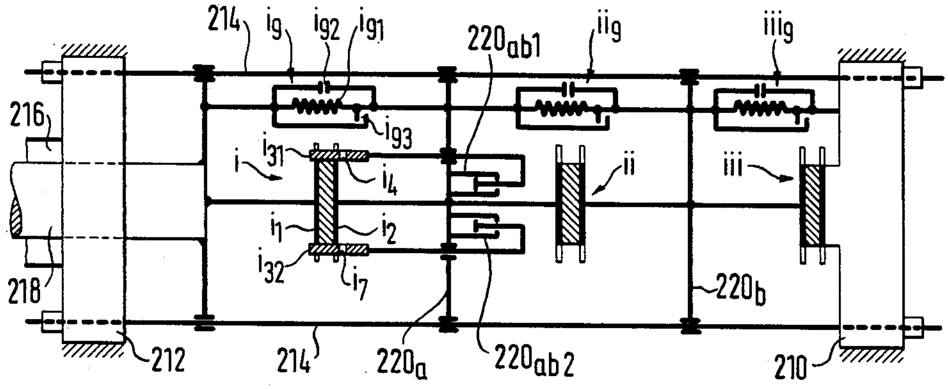
FIG. 12 shows an alternative to the embodiment according to FIGS. 1 to 11, in which the mold is opened by means of spring force, and to close the press mold various closing slides are provided along its top edge and its bottom edge.

FIG. 12 shows an embodiment which does not use a closing frame $i_3$. Instead of this, there are two closing slides $i_{31}$ and $i_{32}$, the upper closing slide $i_{31}$ having the filling orifice $i_4$ and the lower closing slide having the vacuum connection orifice $i_7$. If the vacuum connection orifice $i_7$ has appropriate dimensions, the molding can be removed from the mold through the vacuum connection orifice $i_7$. It is also possible, however, for emptying, to draw back the closing slide $i_{32}$ until the flat molding can fall out next to the closing slide $i_{32}$.

The adjusting devices assigned to the two closing slides $i_{31}$ and $i_{32}$ are denoted by $\mathbf{220}_{ab1}$ and $\mathbf{220}_{ab2}$.

As shown in FIG. 12, opening of the mold is achieved by means which are different to those of the embodiments according to FIGS. 1 to 11. A stop and spring system $i_9$, $ii_9$ and $iii_9$ are assigned to each press mold i, ii, iii. This spring and stop system comprises a compression spring $i_{91}$, a first pair of stops $i_{92}$ and a second pair of stops $i_{93}$. The relative positions of the mold parts after the pressing operation has ended is determined by the first pair of stops $i_{92}$. The positions of the mold halves $i_1$ and $i_2$ relative to one another after a plunger 218 has returned to the mold-opening position is determined by the compression spring $i_{91}$ in conjunction with a second pair of stops $i_{93}$.

Figure 13:
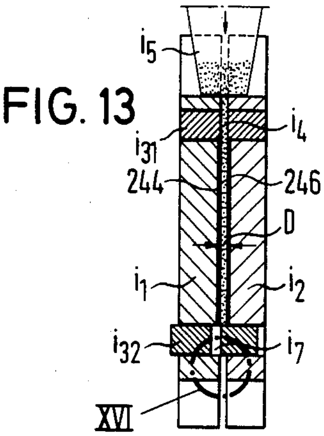
FIGS. 13 to 15 show the position of the closing slides according to FIG. 12, in the filling, pressing and emptying positions of the press mold respectively.
Figure 16:
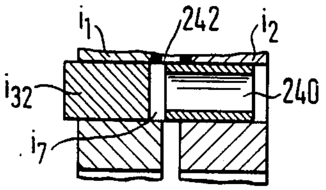
FIG. 16 shows a detail at XV1 of FIG. 13.
Figure 14:
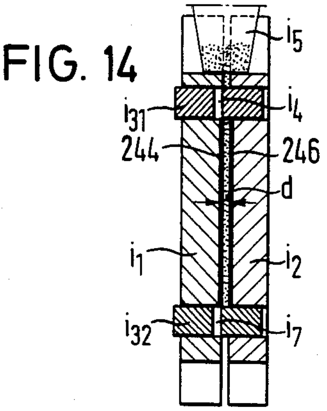
Figure 15:
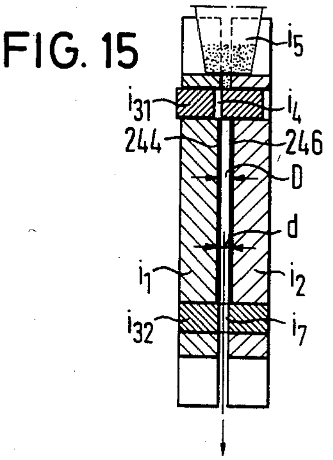

FIGS. 13 to 15 show in detail the closing slides $i_{31}$ and $i_{32}$ in their various operating positions. FIG. 16 illustrating a detail of FIG. 13.

Figure 17:
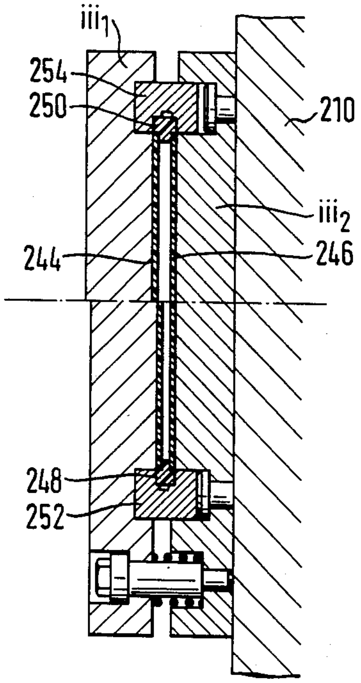
FIG. 17 shows a horizontal section through FIGS. 13 and 14.

As shown in FIG. 13, the closing slide $i_{31}$ is in the filling position, in which the filling orifice $i_4$ permits the connection between the mold cavity and the intermediate hopper $i_5$. The closing slide $i_{32}$ is in the filling position, in which the vacuum is connected to the mold cavity via a channel 240 and the vacuum connection orifice $i_7$ and via a gap 242. As shown in FIG. 14, the filling orifice $i_4$ is separated off from the mold cavity as a result of the displacement of the closing slide $i_{31}$. As shown in FIG. 15, the vacuum connection orifice $i_7$ is in line with the lower end of the mold cavity and thereby serves as an emptying orifice, through which the flat molding falls out of the mold cavity. The mold halves $i_1$ and $i_2$ are provided with elastomer coatings 244, 246. To close off the lateral edges of the mold parts $iii_1$ and $iii_2$, there are, as shown in FIG. 17, elastomer strips 248, 250 which, as can be seen from the difference between the upper part of FIG. 17 and the lower part of FIG. 17, are squeezed together during pressing and consequently penetrate further into the mold cavity. This is advantageous for removal from the mold. The elastomer strips 248, 250 are supported by supporting strips 252, 254 which, as can be seen from a comparison between the upper and lower halves of FIG. 17, can copy the process of bringing the mold parts $iii_1$ and $iii_2$ nearer to one another.

We claim:

1. A process for producing flat moldings comprising arranging a plurality of upright press molds in series with each other with the press molds maintained next to one another in a horizontal direction, each press mold having relatively movable mold parts, effecting relative movement of the mold parts of each of the press molds in the horizontal direction to an open position and introducing particulate molding material into mold cavities so formed; simultaneously effecting relative movement of the mold parts of each press mold to a closed position in which the molding material in each mold cavity is pressed in the horizontal direction to form a flat molding and preventing flow of the particulate molding material into the mold cavity; and effecting relative movement of the mold parts of each press mold to a position in which the flat moldings are removed from the mold cavities.

2. A process as claimed in claim 1 wherein the flat moldings are removed from the respective press molds by falling from the latter.

3. A process as claimed in claim 1 wherein the molding material is introduced into each mold cavity when a vacuum is applied to the latter.

4. A process as claimed in claim 3, wherein the molding material is introduced into each mold cavity as a result of a supply of fluidizing air.

5. A process as claimed in claim 3, wherein the vacuum is maintained at least during part of the pressing operation.

6. An installation for producing flat moldings from a particulate material comprising two terminal cross pieces (10, 12) interconnected by at least two connection bars (14), a plurality of press mold units (i, ii, iii) in series along said connection bars (14) between said terminal cross pieces (10, 12), a press unit (16, 18) allocated to one (12) of said terminal cross pieces (10, 12) for exerting pressure onto said series of press mold units (i, ii, iii) in a direction parallel to said connection bars (14) such as to compress said particulate material within said press mold units (i, ii, iii), each of said press mold units (i, ii, iii) comprising two mold parts ($i_1$, $i_2$; $ii_1$, $ii_2$; $iii_1$, $iii_2$) opposite to each other in a direction parallel to said connection bars (14), a first terminal mold unit (iii) having one mold part ($iii_2$) thereof axially supported by the other terminal cross piece (10), a second terminal mold unit (i) having one mold part ($i_1$) thereof subject to the action of said press unit (16, 18), respective other mold parts ($iii_1$, $i_2$) of said terminal mold units (iii, i) and the mold parts ($ii_i$, $ii_2$) of at least one intermediate mold unit (ii) being guided on said connection bars (14) by at least two intermediate cross pieces (20$_a$, 20$_b$), each said intermediate cross piece (20$_a$, 20$_b$) carrying the mutually adjacent mold parts ($i_2$, $ii_1$; $ii_2$, $iii_1$) of subsequent mold units (i, ii, iii) and—between said mutually adjacent mold parts ($i_2$, $ii_1$)—a mold unit operating device (20$_{ab}$, 20$_{aa}$, 20$_{ac}$, 20$_{ad}$) for opening and closing at least one of a particulate material inlet opening ($i_4$), an evacuation opening ($i_7$) and a molding withdrawal opening of at least one (i) of the mold units (i, ii) adjacent the respective intermediate cross piece (20$_a$).

7. An installation as claimed in claim 6, wherein mold parts belonging to a respective press mold unit (i, ii, iii) are prestressed by spring means ($i_{91}$) to a maximum distance between them defined by stops ($i_{93}$), this maximum distance corresponding to a filling and a removal position of the mold parts ($i_1$, $i_2$).

8. An installation as claimed in claim 6, wherein a press plunger (18) of the press unit (16, 18) is connected with a mold opening linkage (22) which has, for groups of adjacent mold parts ($i_2$, $ii_1$; $ii_2$, $iii_1$) of successive press mold units, an engagement means (22$_{ae}$, 24$_{ae}$) engageable with respective engagement stops (20$_{ae}$, 20$_{be}$).

9. An installation as claimed in claim 6, wherein at least one closing slide ($i_3$) with at least one orifice ($i_4$, $i_7$) is provided for each mold unit (i, ii, iii), this closing slide ($i_3$) being adjustable by means of said mold unit operation device (20$_{ab}$, 20$_{aa}$, 20$_{ac}$, 20$_{ad}$).

10. An installation as claimed in claim 9, wherein a mold unit (i) has an upper closing slide ($i_{31}$) with a filling orifice ($i_4$) therein, there being a lower closing slide ($i_{32}$) with an evacuation orifice ($i_7$) therein.

11. An installation as claimed in claim 9, wherein the adjustment of the closing slide ($i_3$) is derived from the relative movement of the mold parts ($i_1$, $i_2$) in relation to one another.

12. An installation as claimed in claim 9, wherein the mold unit operation device (20$_{ab}$, 20$_{aa}$, 20$_{ac}$, 20$_{ad}$) causes a displacement of the closing slide ($i_3$) during a pressing operation such as to ensure that the relative movement, and consequently the friction, between the molding material and the closing slide ($i_3$) is minimized.

13. An installation as claimed in claim 12, wherein the closing slide ($i_3$) is stressed at least over part of the stroke of the mold unit operation device (20$_{ab}$, 20$_{aa}$, 20$_{ac}$, 20$_{ad}$) by a fluid-controlled stop (20$_{ac}$) which serves to control the movement of the closing slide.

14. An installation as claimed in claim 9, wherein the closing slide ($i_3$) is designed as a closing frame.

15. An installation as claimed in claim 14, wherein the closing frame ($i_3$) has a vacuum connection orifice ($i_7$) in its lower portion.

16. An installation as claimed in claim 14, wherein the closing frame has a filling orifice in its upper portion.

17. An installation as claimed in claim 16, wherein there is arranged on the upper portion of the closing frame ($i_3$) an intermediate hopper ($i_5$) which is connected to a main hopper via a flexible line connection ($i_6$).

18. An installation as claimed in claim 6, wherein a mold unit is closed along at least one edge by an elastic edge strip (250) which can be squeezed between the respective mold parts ($iii_1$, $iii_2$) during pressing, the edge strip (250) being backed by a supporting strip (254).

19. An installation as claimed in claim 6, wherein there is arranged under each of the mold units (i, ii, iii) at the respective locations which they assume after a pressing operation has ended, a curved sliding removal track (26$_i$, 26$_{ii}$) which deflects the flat moldings into a horizontal direction of movement and which, if appropriate, transfers them to a further conveyor.

* * * * *